Jan. 4, 1944.   O. SANDBERG   2,338,132
WRAPPING PAPER CUTTING AND FEEDING MECHANISM
Filed Feb. 17, 1942   3 Sheets-Sheet 3
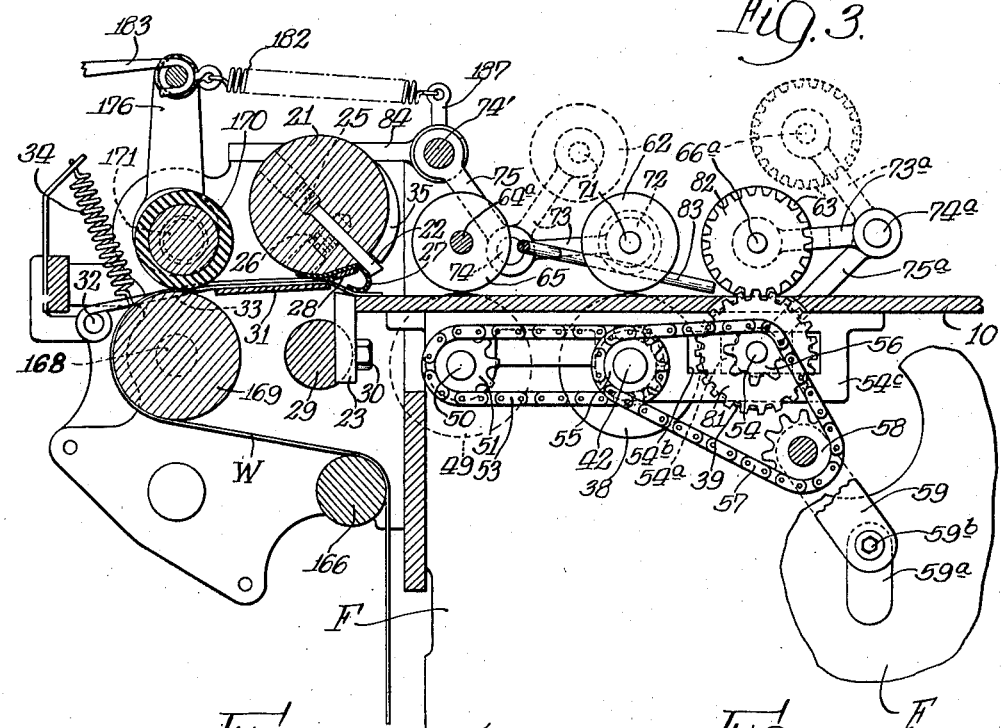
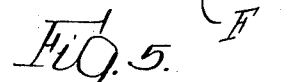
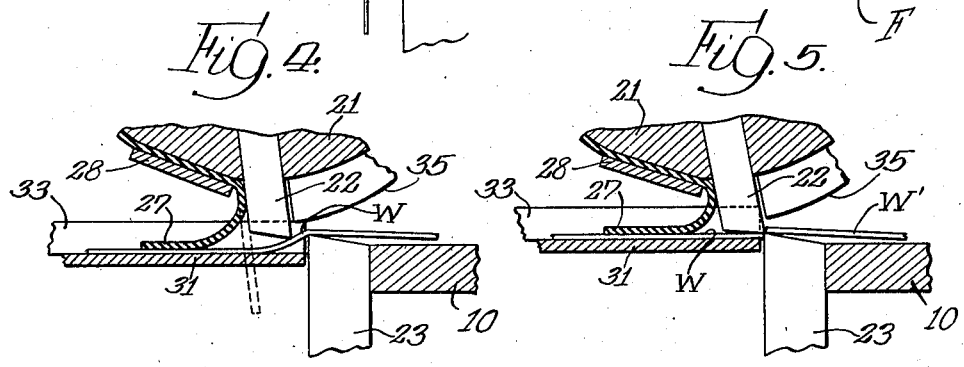
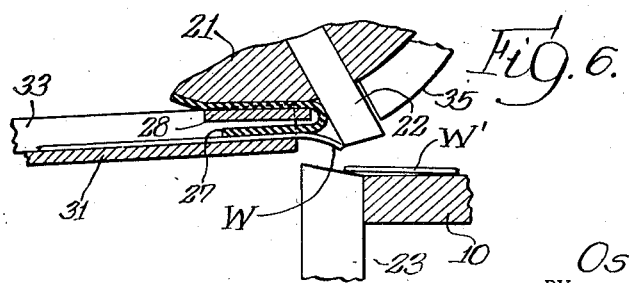
INVENTOR.
Oscar Sandberg,
BY Bair & Freeman
Attys.

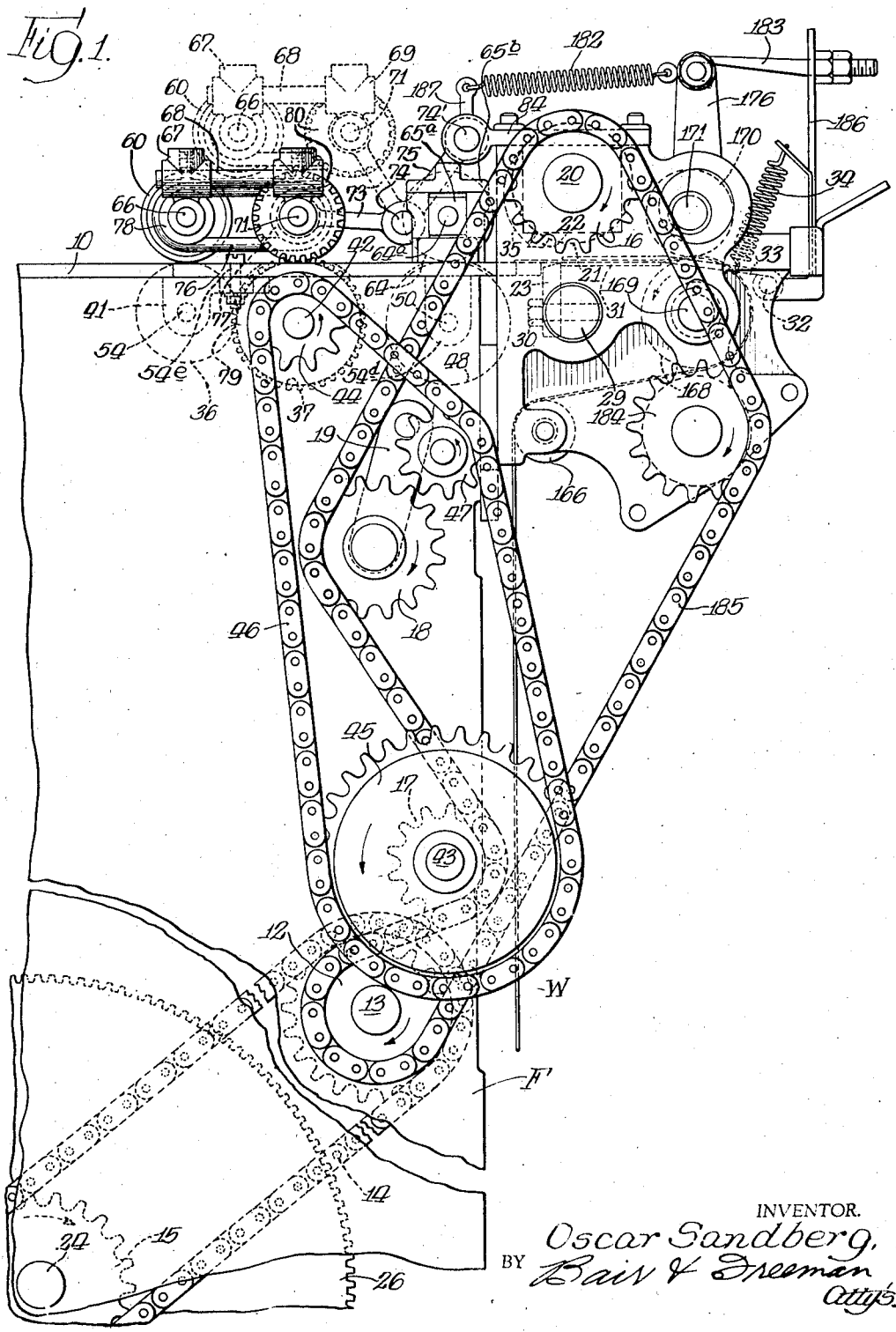

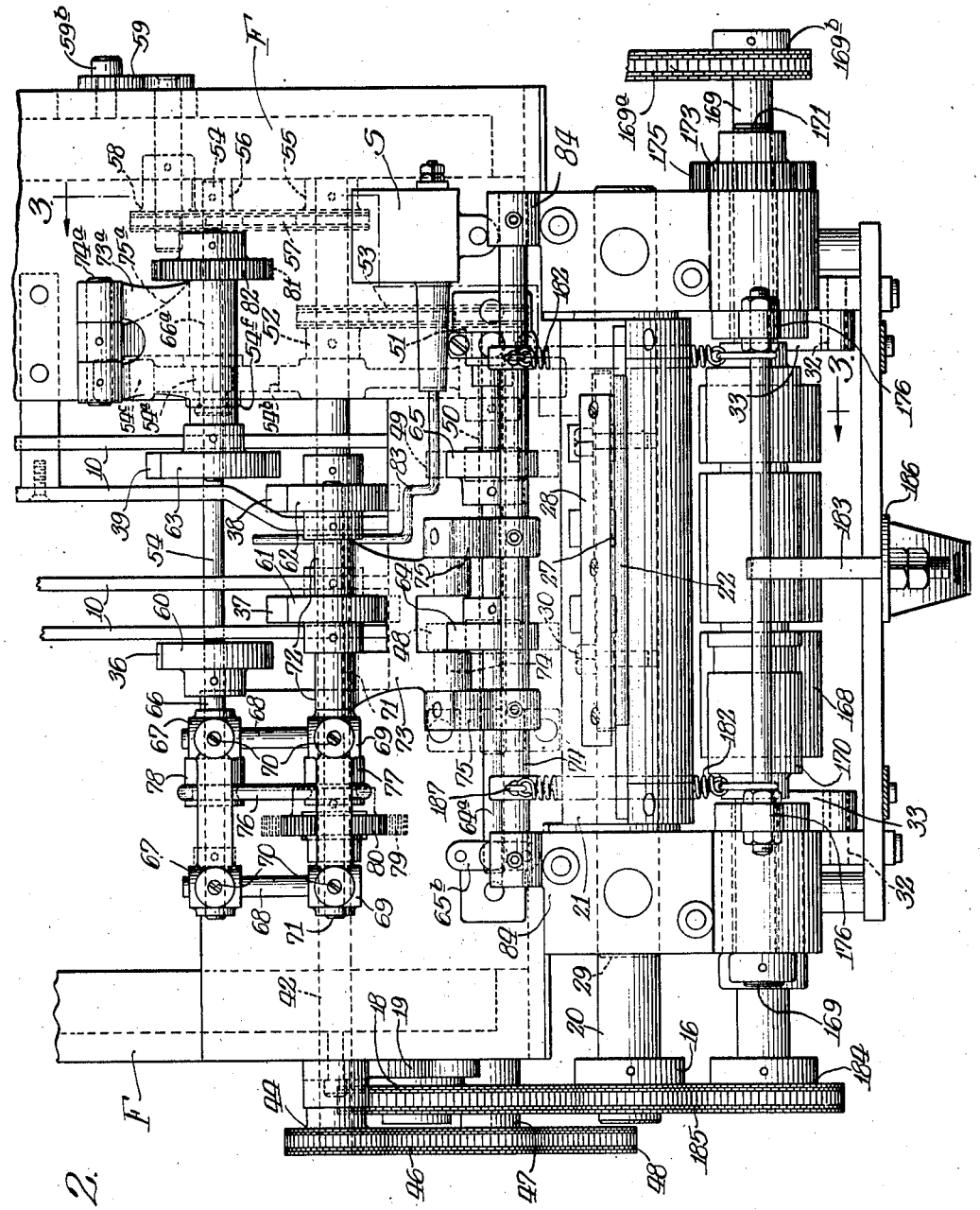

Patented Jan. 4, 1944

2,338,132

UNITED STATES PATENT OFFICE 2,338,132

WRAPPING PAPER CUTTING AND FEEDING MECHANISM

Oscar Sandberg, Defiance, Ohio, assignor to Lynch Manufacturing Corporation, Defiance, Ohio, a corporation of Ohio Application February 17, 1942, Serial No. 431,209

11 Claims. (Cl. 164—68)

My present invention has to do with mechanism for cutting and feeding wrappers to a wrapping machine such as shown in my Patent No. 2,208,776 and in my copending application, Serial No. 317,370, filed February 5, 1940, the present application being a continuation-in-part of my application, Serial No. 317,369, filed February 5, 1940, now Patent No. 2,283,097, issued May 12, 1942.

One object of the invention is to provide means for cutting wrappers from a web of wrapping material and feeding wrappers thus cut onto supporting bars which direct them to a position where the wrappers are wrapped around articles such as candy bars and the like.

Another object is to provide means for cutting the web of wrapping material into sheets or "wrappers" somewhat longer than the candy bars, one form of cutting mechanism being shown in my parent application and the present application disclosing a modification thereof wherein the wrappers are sheared from the web of material by a rotary shearing blade coacting with a stationary blade, means being provided to assure proper feed of the web for cutting of another wrapper therefrom after the first wrapper has been cut.

Still another object is to provide a floating plate associated with the stationary cutter blade for the purpose of lifting the cut end of the web of wrapping material to a position for clearing the stationary cutting blade so that the web of material is properly fed for the next wrapper, there being a resilient strip carried by the movable or rotary cutter blade for insuring that the cut end of the web of material is retained against the stationary blade in the proper manner.

A further object is to provide means for feeding the wrappers into wrapping position in the wrapping machine which eliminates the moving tapes of my copending applications and substitutes therefor supporting rollers at the sides of the supporting bars for the wrappers and companion rollers cooperating therewith.

Still a further object is to provide the companion rollers so mounted that they rest by gravity on top of the wrapper and are supported by the supporting rollers, engagement between the companion rollers and the wrapper being by gravity and the companion rollers being capable of elevation either manually or due to wrinkling of the wrapper against the force of gravity.

Still a further object is to provide means for positively driving the supporting rollers and means for driving the companion rollers from the supporting rollers, the last means comprising gears carried by the companion rollers which lift out of mesh with gears carried by the supporting rollers to thereby stop the rotation of the companion rollers whenever they are lifted either manually or by wrinkling, and therefore improper feeding of the wrapper.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is an end elevation of wrapper cutting and feeding mechanism embodying my present invention showing only the inner side elements of the structure to minimize confusion on the drawing;

Figure 2 is a plan view of my mechanism, Figure 1 being an end view of the left hand end of Figure 2;

Figure 3 is a sectional view on the line 3—3 of Figure 2, again showing only the inner side elements of the mechanism; and Figures 4, 5 and 6 are sectional views similar to a portion of Figure 3, showing a cutting means in different positions of operation.

The wrapping machines of my copending applications are adapted for wrapping articles such as candy bars and the like. The mechanism of this application is adapted to feed a web of wrapping material to the wrapping machine, to cut the web into individual wrappers and to feed the wrappers to wrapping position, the parts being synchronized in operation by mechanical interconnections, as will be described.

The mechanism includes vertical frame members F suitably connected together and supporting the various shafts, rollers, etc., of my mechanism. Journaled in the frame members F is a main drive shaft 24. The drive shaft 24 has secured thereto a gear 26 which may be driven in any suitable manner, as shown in my copending applications.

Wrappers for the articles wrapped in the wrapping machine are supplied in the form of a web W of the proper width and continuous length. The web W passes over an idler roller 166 and then around a feed roller 169. Above the roller 169 a drive roller 170 is provided, at least the roller 170 being of rubber or the like to provide a good grip on the web W and to propel it toward supporting bars 10 when the roller 170 is rotated counter-clockwise (in Figure 3). The roller 170 is mounted on a shaft 171 which is rotated through the gears 173 and 175 from a shaft 169 on which the roller 168 is mounted. The shaft 169, in turn, is rotated by speed changing mechanism fully described in my parent application and driving the shaft 169 by a chain 169a and a sprocket 169b.

A chain 185 extends around a sprocket 12 on a counter-shaft 13 which is driven by a chain 14 from a sprocket 15 on the main shaft 24. The chain 185 also extends around an idler sprocket 184 and around sprockets 16 and 17 and an idler sprocket 18. The sprocket 18 is carried on a supporting arm 19.

For maintaining proper pressure between the rollers 168 and 170 the shaft 171 of the roller 170 is carried at its ends by eccentric levers 176, as shown in my parent application. The eccentric levers 176 are pivoted at their centers and are urged in the proper direction for moving the roller 170 toward the roller 168, as by springs 182, such movement being limited by a limiting hook 183 supported on a bracket 186. The springs 182 at their free ends are connected with stationary arms 187.

The sprocket 16 is mounted on a shaft 20 forming an extension of an arbor 21. A movable cutter blade 22 is carried by the arbor 21 and is adapted to shearingly coact with a stationary cutter blade 23 for severing the web W into individual wrappers. The blade 22 is set into the arbor 21 as shown in Figure 3, with set screws 25 to adjust it radially. Other set screws 26 are provided to retain the adjustment.

Trailing the blade 22 is a strip 27 of resilient material, such as rubber or the like, which serves an important function in the web feeding operation, as will hereinafter appear. The strip 27 is held in position by a strap 28 and normally assumes the dotted position shown in Figure 4. The stationary blade 23 is secured to a rigid cross rod 29 by cap screws 30. A floating plate 31 is carried by a pair of arms 33 pivoted at 32 and normally raised to a position with the arms 33 engaging the arbor 21. The means for biasing the plate 31 to raised position consists of a spring 34 for each arm 33. The arbor 21 carries cams 35 to coact with the arms 33 to lower the floating plate 31 just before a wrapper is cut from the web of wrapping material, as will hereinafter be described.

For propelling the wrappers, indicated at W' in Figures 4, 5 and 6 after they have been severed from the web W, I provide supporting rollers 36, 37, 38, 39, 48 and 49. The rollers 36 and 39 are mounted on a shaft 54 rotatable in bearings 54a and 41. The rollers 37 and 38 are supported on a drive shaft 42 driven from a countershaft 43 on which the sprocket 17 is mounted. Sprockets 44 and 45 are mounted on the shafts 42 and 43 respectively, and are operatively connected together by a chain 46. The chain 46 also extends over an idler 47.

The supporting rollers 48 and 49 are mounted on a shaft 50 journaled in a stationary bracket 54c and an adjustable bracket 54d. The bracket 54d is slotted for adjustment purposes and held in position by a clamp bolt 54e. The shaft 50 is driven by sprockets 51 and 52 and a chain 53 from the drive shaft 42. The shaft 54 is driven from the drive shaft 42 by sprockets 55 and 56 and a chain 57. The chain 57 also extends around an idler sprocket 58 supported on an arm 59, the arm being secured to a boss 59a by a cap screw 59b.

Companion rollers 60, 61, 62, 63, 64 and 65 are provided for the supporting rollers 36, 37, 38, 39, 48 and 49 respectively. The companion rollers are mounted directly above their respective supporting rollers and are arranged to engage the top of the wrapper W' by gravity. For this purpose the rollers 64 and 65 are mounted on a shaft 64a journaled in bearings 65a which float in vertical slots of bearing brackets 65b. The rollers 64 and 65 are free to be rotated by the wrapper W' as it passes under them.

The roller 60 is mounted on a shaft 66 journaled in bearings 67. The bearings 67 are slidable on rods 68 which, in turn, are slidable in bearings 69. Set screws 70 are provided for affixing the bearings 67 and 69 relative to the rods 68. The bearings 69 rotatably carry a shaft 71 which, in turn, is rotatable in a pair of bearings 72 and carries the rollers 61 and 62. The bearings 72 are formed on a bifurcated arm 73 which is oscillatable on stub shafts 74. The stub shafts 74 are fixed in arms 75 which, in turn, are fixed to a shaft 74' whereby the companion rollers 60, 61 and 62 may be swung upwardly, as shown by dotted lines in Figure 1, either manually or by the wrinkling of a wrapper between the supporting rollers and the companion rollers. The shaft 74' is fixed in brackets 84.

The companion roller 60 is driven by a rubber belt or the like 76 cooperating with pulleys 77 and 78 on the shafts 71 and 66 respectively. The rubber belt 76 permits adjustment of the shaft 66 toward or away from the shaft 71 when it is desirable to set the roller 60 for shorter or longer wrappers.

Like the companion roller 62, the companion roller 63 is carried by a bifurcated arm 73a pivoted on a shaft 74a. The arm 73a carries a shaft 66a for the roller 63. The shaft 74a is supported by a bracket 75a. The bracket 75a is carried by the bearing 54a which is adjustable in a slot 54b of the bracket 54c. The bearing 54a has a lock nut 54f screwed thereon to retain the adjustment.

It is desirable to stop rotation of the companion rollers 60, 61, 62 and 63 when they are elevated, either manually or by the wrinkling of the wrapper. This is done by driving them through gears 79 and 80 (for the rollers 60, 61 and 62) and gears 81 and 82 (for the roller 63). The gears 79 and 81 are carried by the shafts 42 and 54, while the gears 80 and 82 are carried by the shafts 71 and 66a respectively. Accordingly, when the shafts 71 and 66a raise, they also raise the gears 80 and 82 out of mesh with the gears 79 and 81.

When a wrapper wrinkles in the mechanism it is desirable to stop the machine, and this is accomplished through a switch S connected with the main driving motor and operated to off position by an arm 83 pivoted in the switch housing and extending to a position where it will be lifted by a wrapper that starts to wrinkle.

*Practical operation*

In the operation of my wrapper cutting and feeding mechanism the web W is fed to cutting position between the rotating rollers 169 and 170. As the arbor 21 rotates, the cams 35 will first engage the arms 33 to depress the plate 31 and then the blade 22 will engage the web, as shown in Figure 4, as the rotating cutter blade 22 approaches the stationary cutter blade 23, bending the web between the cutting edges of the blades. When the blade 22 reaches the blade 23 it will shear the web in two, as illustrated in Figure 5, so that the wrapper W' will thereby be separated from the web. The supporting and companion rollers by this time have engaged the wrapper W' so as to pull it on into the machine, sliding it along the tops of the bars 10 to wrapping position. The floating plate 31 will thereupon lift the oncoming web W, as in Figure 6, to clear the forward edge of the cut web with respect to the stationary blade 23 and permit the web to be fed to position for cutting another wrapper therefrom. The flexible strip 27 closely following the moving blade 22, will keep the cut edge of the web from curling up, and, instead, it will press it toward the floating plate 31 and the stationary blade 23, as shown in this figure.

Any time that the wrapper gets wrinkled instead of feeding properly to wrapping position, the companion rollers will be lifted by the wrapper and indicate to the operator that the mechanism is functioning improperly. The operator may readily lift the companion rollers out of the way to remove the wrinkled portion of the wrapper, whereupon the machine may again be started. The mechanism is so designed as to minimize necessary stoppage of the machine due to improper functioning. Any wrinkled wrappers, however, may be quickly removed, thus minimizing the time required to again place the machine in operation.

While I have shown a particular embodiment of my invention, it will be understood, of course, that I do not wish to be limited thereto since many modifications may be made, and I therefore contemplate by the claims appended hereto to cover any such modifications or substitutions of mechanical equivalents as fall within the true spirit and scope of my invention without sacrificing any of its advantages.

I claim as my invention:

1. Wrapping paper cutting and feeding mechanism comprising feeding means for a web of wrapping material, cutting means for cutting the web into individual wrappers, feeding means for the wrapper cut from said web comprising rollers for supporting the wrapper and companion rollers resting on top of the wrapper, means for driving said supporting rollers, gears driven with said supporting rollers, means for driving said companion rollers comprising gears cooperating with said first gears, and pivotally supported arms for mounting said companion rollers so that they may be swung upwardly from normal position resting by gravity on said supporting rollers.

2. Wrapper cutting and feeding mechanism comprising cutting means for cutting a web into individual wrappers, supporting bars for the individual wrappers cut from said web, and means for propelling the individual wrappers along said bars comprising supporting rollers and companion rollers beneath and above the wrappers respectively, means for driving said supporting rollers, said companion rollers being geared thereto, and means for supporting said companion rollers so that they engage the wrappers by gravity and permit movement of the companion rollers away from the supporting rollers and simultaneous unmeshing of said gears upon the wrapper wrinkling and clogging the rollers.

3. Means for cutting and feeding wrappers to a wrapping machine comprising a frame, means for feeding a web of material through said frame, means for cutting said web into individual wrappers comprising a stationary blade and a rotary blade shearingly cooperating therewith, means for propelling the wrappers cut from the web of material comprising supporting rollers beneath the wrapper, supporting bars also beneath the wrapper, companion rollers engaging the tops of the wrappers and located directly over said supporting rollers, supporting arms pivoted to said frame and having bearings on their free ends for supporting the shafts for said companion rollers, said arms being freely pivoted whereby said companion rollers may be raised away from said wrappers, means for driving said supporting rollers in timed relation to said rotary blade, and means for driving said companion rollers and permitting them to stop rotating when lifted from wrapper engaging position comprising gears carried by their shafts and meshing with gears on the shafts of said supporting rollers when said companion rollers are in wrapper engaging position.

4. Means for cutting and feeding wrappers to a wrapping machine comprising a frame, means for feeding a web of material through said frame, means for cutting said web into individual wrappers, and means for propelling the wrappers cut from the web of material comprising supporting rollers beneath the wrapper, companion rollers engaging the tops of the wrappers and located directly over said supporting rollers, supporting arms pivoted to said frame and having bearings on their free ends for supporting the shafts for said companion rollers, said arms being freely pivoted whereby said companion rollers may be raised away from said wrappers, and means for driving said companion rollers in timed relation to said supporting rollers and permitting them to stop rotating when lifted from wrapper engaging position.

5. Means for cutting and feeding wrappers to a wrapping machine comprising a frame, means for feeding a web of material relative to said frame, means for cutting said web into individual wrappers including a rotary blade, and means for propelling the wrappers cut from the web of material comprising supporting rollers beneath the wrapper, companion rollers engaging the tops of the wrappers and located directly over said supporting rollers, supporting means for said companion rollers, said supporting means permitting said companion rollers to be raised away from said wrappers, means for driving said supporting rollers in timed relation to said rotary blade, and means for driving said companion rollers in timed relation to said rotary blade and said supporting rollers.

6. In a wrapper cutting and feeding mechanism, a frame, supporting bars mounted on said frame, means for cutting and feeding wrappers onto said supporting bars, and means for propelling the wrappers along the supporting bars comprising supporting rollers under the wrappers and companion rollers engaging the tops of the wrappers by gravity, said companion rollers being located directly above and supported by said supporting rollers, means for holding said companion rollers in proper alignment comprising arms therefor, said arms being pivoted to said frame to permit upward movement of said companion rollers away from said supporting rollers and wrappers, means for driving said supporting rollers and means for driving said companion rollers comprising gear connections between the two which are unmeshed with respect to each other when said companion rollers are lifted from the wrappers.

7. In a wrapper cutting and feeding mechanism, a frame, supporting bars mounted on said frame, means for cutting wrappers and feeding them onto said supporting bars, and means for propelling the wrappers along the supporting bars comprising supporting rollers under the wrappers and companion rollers engaging the tops of the wrappers, said companion rollers being supported by said supporting rollers, means for holding said companion rollers in alignment comprising pivoted supporting arms therefor, means for driving said supporting rollers and means for driving said companion rollers comprising gear connections between the two.

8. In a wrapper cutting and feeding mechanism, a frame, supporting bars mounted on said frame, means for cutting and feeding wrappers onto said supporting bars, and means for propelling the wrappers along the supporting bars comprising rollers under the wrappers and companion rollers located directly above and supported by said supporting rollers with the wrappers interposed, arms for holding said companion rollers in alignment and permit upward movement of said companion rollers away from said supporting rollers and wrappers, means for driving said supporting rollers, means for driving said companion rollers, and means for rendering said last driving means inoperative when said companion rollers are lifted from the wrappers.

9. Wrapper cutting and feeding mechanism comprising cutting means for cutting a web into individual wrappers, supporting bars for the individual wrappers cut from said web, and means for propelling the individual wrappers along said bars comprising supporting rollers and companion rollers beneath and above the wrappers respectively, means for driving said supporting rollers, said companion rollers being geared thereto, and means for supporting said companion rollers so that they engage the wrappers by gravity.

10. Wrapper cutting and feeding mechanism comprising cutting means for cutting a web into individual wrappers, supporting bars for the individual wrappers cut from said web, and means for propelling the individual wrappers along said bars comprising supporting rollers and companion rollers beneath and above the wrappers respectively, means for driving said supporting rollers, said companion rollers being geared thereto, and means for supporting said companion rollers so that they may move away from the supporting rollers and simultaneously unmesh said gears.

11. Wrapper cutting and feeding mechanism comprising cutting means for cutting a web of wrapping material into individual wrappers, and means for propelling the individual wrappers away from said cutting means comprising supporting rollers and companion rollers beneath and above the wrappers respectively, means for driving said supporting rollers, said companion rollers being geared thereto for unmeshing therefrom upon the wrapper wrinkling and clogging the rollers.

OSCAR SANDBERG.